May 13, 1952  A. E. WILDE  2,596,317
BISCUIT-CUTTING AND THE LIKE MACHINERY
Filed Sept. 8, 1949

INVENTOR.
Albert E. Wilde
BY
John James Victor Armstrong
ATTORNEY

Patented May 13, 1952

2,596,317

UNITED STATES PATENT OFFICE 2,596,317

BISCUIT-CUTTING AND THE LIKE MACHINERY

Albert Edward Wilde, Earlestown, Newton-le-Willows, England, assignor to T. & T. Vicars Limited, Earlestown, Newton-le-Willows, England, a British company Application September 8, 1949, Serial No. 114,477
In Great Britain December 1, 1948

1 Claim. (Cl. 107—20)

The present invention concerns biscuit cutting and like machinery, particularly of the type in which biscuit blanks are cut from dough sheets.

A known form of cutter equipment used for working in conjunction with a biscuit cutter machine of the reciprocating type is in the form of a series of cutting shells attached to a block which is in turn rigidly secured to the cutter head of the machine. Means for ejecting cut biscuits and the superfluous dough outside of the shell after the cutting operation has taken place are in the form of ejectors disposed inside and outside of the shells respectively. It has been usual in this previous form of machine for helical compression springs to be shrouded within the sides of the block carrying the cutting shells, disposed so as to be energized during the cutting action and de-energized by moving the ejectors relative to the cutting shells during their retraction.

This form of construction has been the cause of considerable inconvenience, when, for instance, one or more of the helical compression springs have broken or become inoperative or when it has been necessary to change the number or type of cutting shells employed. It has previously been necessary to remove the whole of the cutter block from the head of the machine and to dismantle the ejector arrangement therefrom in order to effect the necessary replacements, and to reassemble the parts again. Since many of the components of the biscuit cutter, in particular the cutter block, are of robust and therefore heavy construction, this dismantling has been a necessarily slow and careful procedure.

It is an object of the present invention to provide a biscuit cutter in which by special construction of the cutter block an easy method of spring or cutter shell replacement is provided.

It is also an object of the invention to provide alternative spring means which are more reliable and less subject to breakdown than a plurality of helical compression springs.

According to the present invention a biscuit cutter adapted to be attached to the reciprocating head of a machine comprises a cutter block, cutting shells attached thereto, outside and inside ejectors for said shells and spring means consisting of one or more leaf springs adapted to activate said ejectors.

The cutter block preferably comprises an upper and a lower portion, the cutting shells being attached to the lower portion.

The lower portion of the cutter block may be detachable from the upper portion by quick release means attached to one of said portions and engaging with the other portion.

The inside and outside ejectors may be secured to an ejector plate disposed within the upper portion of the cutter block where the springs means may also be disposed, being secured to the upper portion and bearing on the ejector plate so as to urge the plate downwards with respect to the cutter block when they are energized.

Stops may be disposed on the ejector plate or the outside ejector so as to arrest the ejectors clear of the material to be cut as the cutter block is moved towards the material.

The invention will be described further with reference to the accompanying drawings in which.

Figure 1:
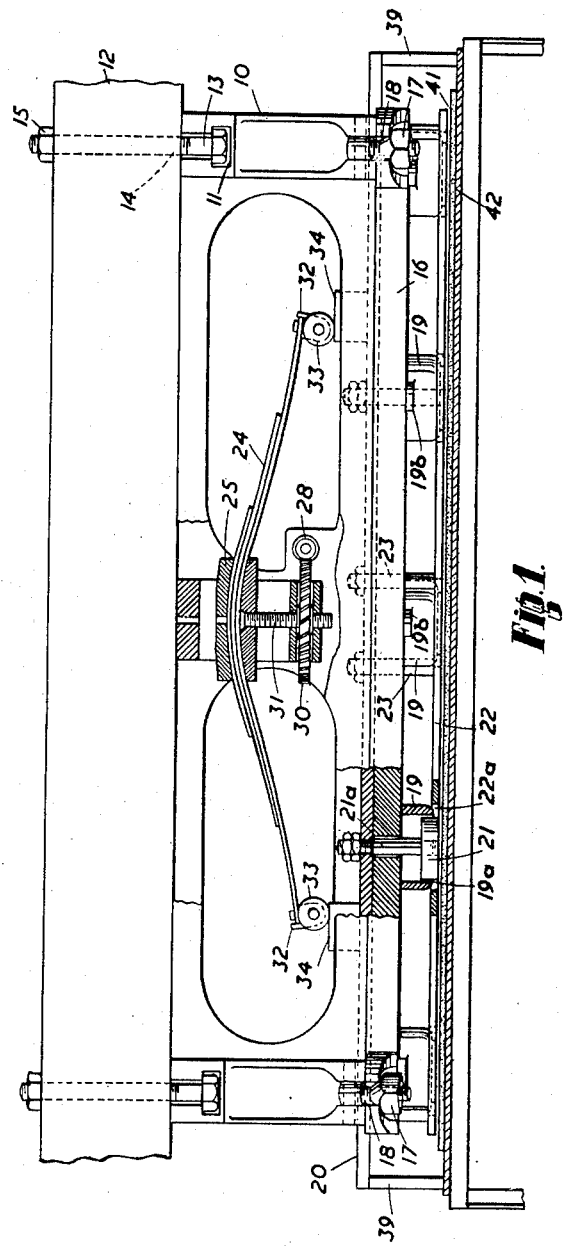
Fig. 1 is an elevation in part section of one form of biscuit cutter attached to a reciprocating head.
Figure 2:
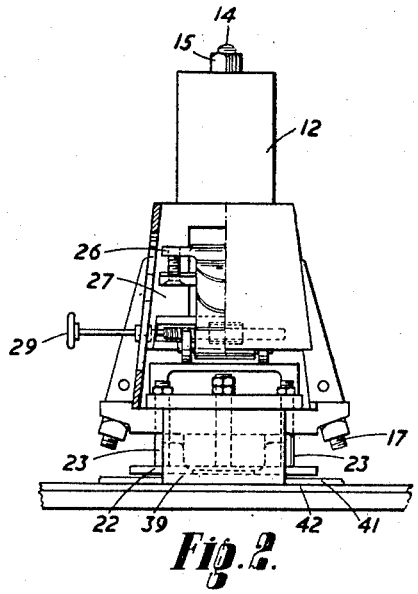
Fig. 2 is a part sectional and elevation corresponding to Fig. 1.

A cutter block comprises two portions, the first or upper portion 10 is of a rib-like hollow construction having a substantially trapezoidal cross section. T-sloth 11 are provided in the upper surface in order that the portion may be secured to the reciprocating head 12 of a machine by means of bolts 13 fitting into the T-slots 11, passing through clearance holes 14 in the head 12 and secured by nuts 15. A lower portion 16 of the cutter block is in the form of a flat plate which is detachably secured to the upper portion 10 by means of swivelling clamping members 17 attached to the upper portion 10 which engage in corresponding slots 18 in the perimeter of the lower portion 16. The lower portion 16 carries one or more cutting shells 19. The shells 19 may, for example, take the form of hollow cylinders having a circular cutting edge 19a at one end. They are attached to the lower portion 16 of the cutter block by means of flanges 19b having clearance holes for bolts to pass therethrough and into the under surface of the lower portion 16 of the cutter block.

An ejector plate 20 is disposed longitudinally within the cutter block upper portion 10 and has attached to it internal and external ejection means. The internal ejectors 21 consist of solid plugs slidably and snugly fitting within the cutting shells 19. Attachment to the ejector plate 20 is by means of studs 21a. The outside ejection means consist of a plate 22 which has apertures 22a closely corresponding to the outside form of the cutting shells 19 and is also secured to the ejector plate 20 by stud means. In this case the studs 23 pass through clearance holes in the lower portion 16 of the cutter block prior to attachment to the ejector plate 20. When the biscuit cutter is in an inoperative position the lower faces of the inside and outside ejectors and the cutting edge of the shells lie either in the same plane or preferably with the cutting edge 19a of the shells retracted by a small amount with respect to the ejectors.

A leaf spring 24 lies longitudinally within the hollow cutter block upper portion 10 (Fig. 1) and is gripped at its mid part by a clamping member 25. The clamping member has lugs 26 at either end thereof which engage on each side of two opposite ribs 27 of the cutter block upper portion 10, the clamping member 25 being guided vertically thereby. A worm 28 having a handle 29 externally of the cutter block engages with a worm wheel 30 which in turn rotates an integral co-axial screw jack 31 carrying the clamping member 25. Each extremity of the leaf spring 24 has attached to it a clip 32 which grips a roller 33, each roller bearing on a bridge portion 34 which is integral with or attached to the ejector plate 20.

It is desirable that stop means should be introduced to arrest the downward movement of the ejectors immediately above the surface of the dough or other material which is to be cut. This may be achieved (Fig. 1) by making the ejector plate 20 longer than the cutter block and by having integral or detachable stops 39 attached to either end of required length.

In operation the machine head 12 during its downward motion carries with it the biscuit cutter. By having the stop means 39 and 40 extending below the bottom face of the outside ejector 22 by an amount substantially equal to the thickness of the dough 41 the ejectors (21 and 22) will be arrested when the stops contact the dough support 42. As the machine head 12 continues its downward motion so will the cutting shells 19 and they will therefore blank out from the dough 41 the necessary shapes. During the part of the downward movement when the ejectors are stationary the spring means are energised. As the machine head reverses its motion and commences on its upward stroke the energised spring or springs now urge the ejectors downwards and maintains them stationary as the cutting shells 19 retract from the dough 41 and the blanks of dough and the superfluous dough are thus separated by the inside and outside ejectors respectively from the cutting shells. When the inside and outside ejectors and the cutting shells have reached their normal inoperative relationship the whole biscuit cutter ascends with the head of the machine prior to the cycle being repeated.

A suitable spring tension may be obtained by manipulation of the handle 29.

If it is required to remove or replace one or more cutting shells or springs, then the machine head 12 is arrested in an upper position, the swivelling clamping member 17 released and the cutter block lower portion 16 removed. Prior to this operation the spring tension will normally have been completely released by rotating the handle 29 and raising the screw of the hand jack 25. Any necessary replacements or re-arrangements may now be effected without any further complicated dismantling or removal of heavy parts.

I claim:

A biscuit cutter including in combination a cutter block, a plurality of cutting shells secured to said block, an ejector plate disposed on said block, ejectors associated with said cutting shells, means rigidly connecting the said ejectors to said ejector plate, a leaf spring extending between a part of the cutter block and a part of the ejector plate below and displaced to one side of said first mentioned part to urge the ejector plate and ejectors in a downwards direction, means to fixedly retain the spring to one of said parts, and means to vary the vertical distance between the said parts to adjust the tension of the said spring.

ALBERT EDWARD WILDE.

REFERENCES CITED

The following references are of record in the file of this patent:

UNITED STATES PATENTS

| Number | Name | Date |
| --- | --- | --- |
| 557,821 | Hull | Apr. 7, 1896 |
| 1,231,817 | Vicars, et al. | July 3, 1917 |
| 1,960,416 | Monks | May 29, 1934 |
| 2,153,067 | Alltimes | Apr. 4, 1939 |